(12) United States Patent
Muroi et al.

(10) Patent No.: US 7,128,090 B1
(45) Date of Patent: Oct. 31, 2006

(54) WATER-HAMMER PREVENTING UNIT FOR CHECK VALVE

(75) Inventors: Akira Muroi, Saitama (JP); Tetsuro Miura, Saitama (JP)

(73) Assignee: Tozen Corporation, Saitama (JP)

( * ) Notice: Subject to any disclaimer, the term of this patent is extended or adjusted under 35 U.S.C. 154(b) by 0 days.

(21) Appl. No.: 11/217,722

(22) Filed: Sep. 1, 2005
(Under 37 CFR 1.47)

(51) Int. Cl.
*F16K 47/02* (2006.01)
*F16L 55/045* (2006.01)

(52) U.S. Cl. .................... 137/513.7; 137/527; 138/30
(58) Field of Classification Search ............ 137/513.7, 137/527, 527.2, 527.4, 527.6, 527.8; 138/26, 138/30
See application file for complete search history.

(56) References Cited

U.S. PATENT DOCUMENTS 4,186,775 A * 2/1980 Muroi .................... 138/30

FOREIGN PATENT DOCUMENTS

| JP | 54020274 A | * | 2/1979 |
| JP | 07-145870 | | 6/1995 |
| JP | 07293721 A | * | 11/1995 |

* cited by examiner

*Primary Examiner*—Ramesh Krishnamurthy
(74) *Attorney, Agent, or Firm*—Flynn, Thiel, Boutell & Tanis, P.C.

(57) ABSTRACT

In a water-hammer preventing unit for a check valve according to the present invention, a retainer pipe having openings at two edges thereof is provided inside a short pipe to form a circular space with the short pipe, and openings are formed on this retainer pipe. Further an elastic tube is provided on an external peripheral surface of the retainer pipe and covers the openings, and a communication path is formed between the short pipe and the valve body holder, and the communication path communicates the circular space to the flow path in the upstream side of the valve body and, when a fluid flows in the reverse direction, a portion of the fluid is accommodated from the opening into the circular space by expanding the elastic tube toward the circular space, and also flows a portion of the fluid in the said circular space to the flow path in the upstream side from the valve body.

5 Claims, 3 Drawing Sheets

WATER-HAMMER PREVENTING UNIT FOR CHECK VALVE

FIELD OF THE INVENTION

The present invention relates to a water-hammer preventing unit for a check valve installed, for instance, in a conduit for supply water or industrial water.

BACKGROUND OF THE INVENTION

There are various types of check valves based on the swing system, butterfly system, lift system, or cone system. Of these check valves, a check valve based on the swing system has, as components of the basic configuration, a valve box having a flow path, and a valve body rotatably mounted on a valve shaft and functioning to open or close the flow path of the valve box. A document disclosing this type of check valve is, for instance, Japanese Patent Laid-Open Publication No. HEI 7-145870. This document discloses a check valve based on the swing system in which a valve body is energized and turned by a spring to the valve-closing direction, and the spring is wound around a spring guide bar provided at a downstream position off from the valve shaft and also in parallel to the valve shaft. With this configuration, the energizing force of the spring acting to the valve body becomes stronger, which ensures quick opening and closing operations of the valve body and prevention of generation of water hammer.

In the check valve based on the conventional technology as described above, when a fluid flows in the reverse direction, the spring energizing the valve body to turn in the valve-closing direction prevents the valve from being quickly closed, but it is required to provide the spring guide bar as described above, a bearing guide and the like as described above to prevent water hammer, which complicates a structure inside the valve box and requires facility cost, and therefore the cost becomes disadvantageously high. There has been proposed a valve body having a small valve hole provided thereon, but in this case it is required to additionally provide a small valve body for opening and closing the small valve hole, and the valve body is easily broken when used for a long time, which is disadvantageous. Further there has been proposed the configuration in which a bypass conduit communicating an upstream side of the valve box flow path to the downstream side thereof is provided outside the valve box, but in this case a certain space is necessary outside the valve box, which sometimes causes troubles in installation of the valve.

SUMMARY OF THE INVENTION

An object of the present invention is, for solving the problems as described above, to provide a water-hammer preventing unit capable of effectively preventing water hammer with a simple structure.

To achieve the object described above, the water-hammer preventing unit for a check valve according to the present invention comprises a valve body holder having a flow path, a hollow and short pipe having two open edges with an open edge thereof communicated to the flow path in the valve body holder, a valve body provided in the said valve body holder so that the flow path can be opened or closed, an energizing member for energizing the valve body in the valve-closing direction, a retainer pipe having openings at two edges thereof provided in the said short pipe to form a circular space with the short pipe with an opening formed on the peripheral wall thereof, and an elastic tube provided on an external peripheral surface of the retainer pipe and covering the opening thereon, and is characterized in that a communication path is formed between the short pipe and the valve body holder, and the communication path communicates the circular space to the flow path in the upstream side of the valve body and, when a fluid flows in the reverse direction, a portion of the fluid is accommodated from the opening into the circular space by expanding the elastic tube toward the circular space, and also flows a portion of the fluid in the said circular space to the flow path in the upstream side from the valve body.

With the present invention, as the configuration described above, even when a reverse flow occurs in the flow path and the pressure is rapidly raised, the pressure is escaped to inside of the circular space by expanding the elastic tube, and also a portion of the fluid in the circular space is escaped by communicating the communication path to the flow path in the upstream side of the valve body, so that water hammer can effectively be prevented. In addition, the structure can be simple only by providing retainer pipe and an elastic tube in the short pipe and also by provides a communication path between the short pipe and the valve body holder, and the facility cost can be suppressed to a low level.

BRIEF DESCRIPTION OF THE INVENTION

DETAILED DESCRIPTION OF THE INVENTION

An embodiment of the present invention is described below with reference to the related drawings.

Figure 1:
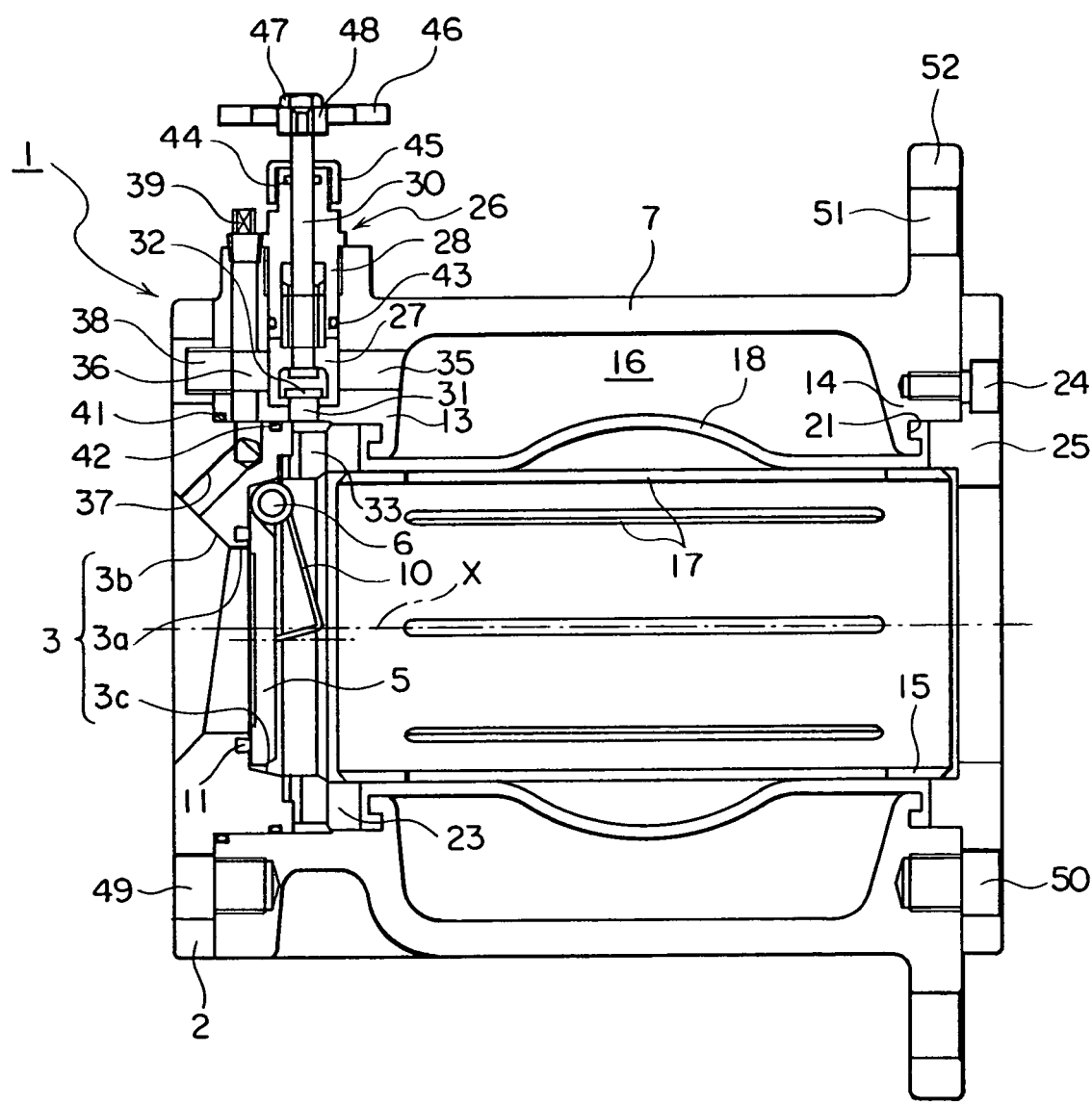
FIG. 1 is a longitudinal sectional view showing a check valve based on the swing system according to one embodiment of the present invention.
Figure 2:
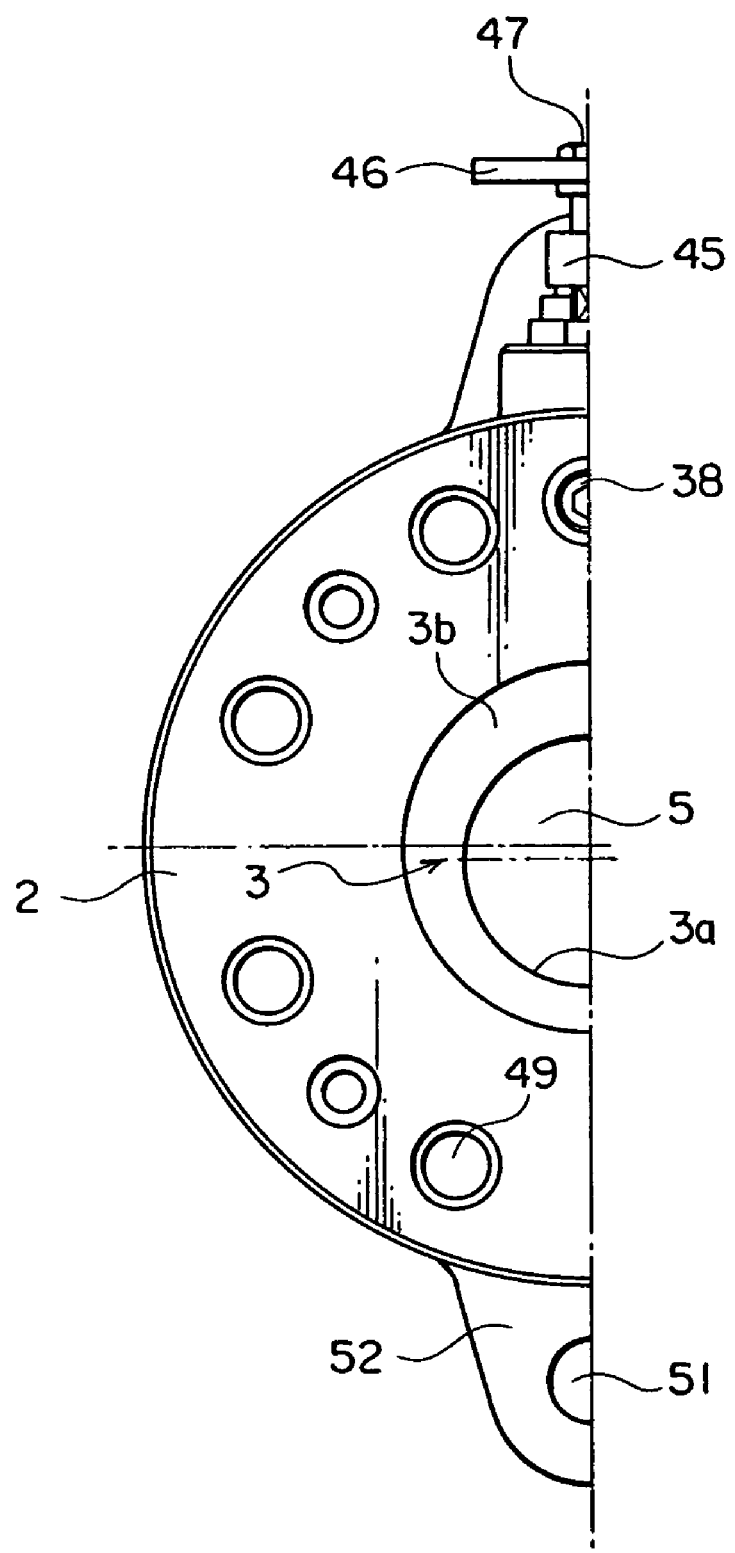
FIG. 2 is a side view showing the check valve with a right half thereof omitted shown in FIG. 1 and viewed from the left side.
Figure 3:
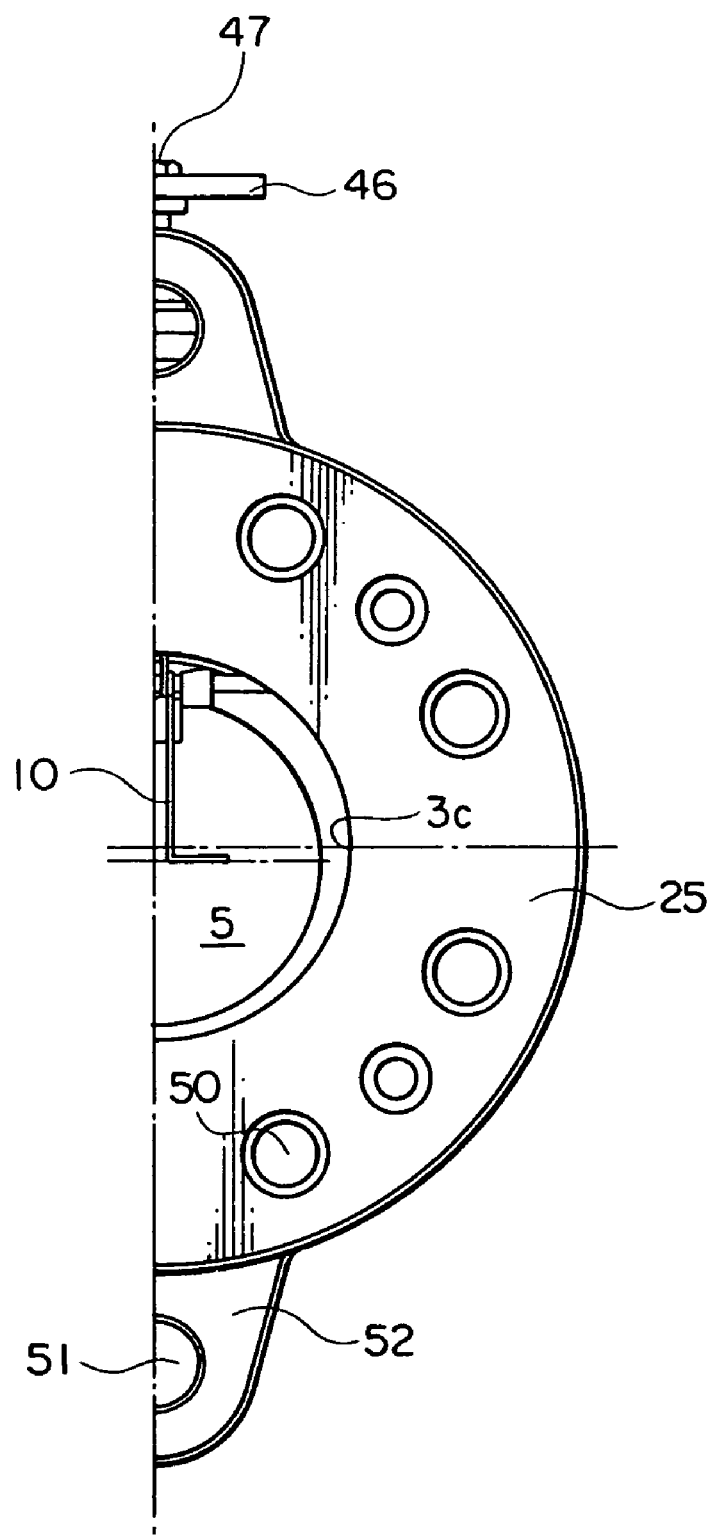
FIG. 3 is a side view showing the check valve with a left half thereof omitted shown in FIG. 1 and viewed from the right side.

In FIG. 1, designated at reference numeral 1 is a check valve based on the swing system; and at 2 a valve body holder (valve box), and in the valve body holder, a flow path 3 with the relatively short length in the axial direction is formed, and a valve body 5 for opening and closing the flow path is rotatably supported by a valve shaft 6. Reference numeral 7 indicates a hollow and short pipe having two open edges, and an open edge section thereof is communicated to the flow path 3 in the valve body holder 2.

The flow path 3 of the valve body holder 2 has a central hole section 3a provided in the central section and slightly off downward from the center line X of the flow path 3. The central hole section 3a is formed in parallel to the center line X, and a length of the axial direction in the upstream side is shorter than that in the downstream side as shown in FIG. 1. Further the central hole section 3a is formed on a tapered face 3b extending from the edge section in the upstream side toward the opening in the upstream side of the flow path 3 concentric to the center line X. A circular recess 3c is formed in the downstream side from the central hole section 3a, and a valve body 5 is set in the recess in the engaging state. An edge of the valve body 5 is hanged on a valve shaft 6, and the other edge thereof is always energized to the valve-closing direction by a spring 10 provided on and contacting a rear surface of the valve body. The other edge of the spring 10 contacts a central portion of the rear surface of the valve body 5 in the pressing state, so that the energizing force of the spring 10 is homogeneously loaded to the entire peripheral surface of the valve body. Reference numeral 11 is a valve sheet which the external side face of the valve body 5 in the upstream side contacts when fully closed, and is provided in the circular state on a side face crossing the center line X of the flow path 3 in the circular recess 3c at right angles.

The hollow and short pipe 7 has the substantially same external diameter as that of the valve body holder 2, but circular projecting sections 13, 14 oriented inward are formed at both edge sections thereof, and a retainer pipe 15 is provided concentrically in the inner section between the two circular projecting sections and forms a circular space 16 with the short pipe 7. A plurality of slit-like openings 17 are provided on a peripheral wall of the retainer pipe 15, excluding the two edge sections thereof, with a prescribed space in between in the circumferential direction by cutting along the axial direction. Reference numeral 18 indicates an elastic tube having the sufficient flexibility, and provided on an external peripheral surface of the retainer pipe 15 to cover the openings 17. The elastic tube 18 is held in the two edge sections thereof by the external peripheral surfaces of the two edge sections of the retainer pipe 15 and the external peripheral surfaces of the two edge sections of the short pipe 7, and is bent inward and engaged in circular recess portions 21 formed on the external surfaces of the circular projecting sections 13, 14, and further one edge section thereof in the upstream side is pressed by a retainer ring 23 provided in a gap between the circular projecting section 13 on the short pipe 7 and the valve body holder 2, while another edge portion thereof is pressed and fixed by an exit ring 25 attached with a bolt to a rear edge surface of the circular projecting section 14 on the short pipe 7.

Reference numeral 26 indicates a bypath valve provided for draining water, and is provided together at an edge section of the short pipe 7 contacting the valve body holder 2 of the check valve 1 based on the swing system. Reference numeral 27 indicates a bypass valve chamber, and a bonnet 28 is provided in the inserted state in the chamber 27, and a valve stem 30 penetrating the bonnet in the vertical direction is provided so that the valve stem 30 can move in the vertical direction. A disk 32 for opening and closing a valve port 31 of the bypass valve chamber 27 is attached to a lower edge portion of the valve stem 30. The valve port 31 is communicated to a communication hole 33 provided in the retainer ring 23, and inside of the retainer pipe 15 and the bypass valve chamber 27 are communicated to each other via the communication hole 33 and valve port 31. The bypass valve 26 is provided not with a sidelong posture as shown in the figure, but with an upright posture with the short pipe 7 set in the vertical direction, and when the valve body 5 is fully closed, the disk 32 opens the valve port 31, thus fluid stayed in the downstream piping including the short pipe 7 being drained.

The communication hole 35 communicating the bypass valve chamber 27 and the circular space 16 is formed in the circular projecting section 13 in parallel to the axial line of the short pipe 7, and also a communication hole 36 is provided in the side facing against the said communication hole in parallel as well as in crossing at right angles to the axial line of the short pipe 7. The communication hole 36 is communicated to a communication hole 37 provided with a diagonally downward posture in the valve body holder 2 and communicated to the flow path 3 in the upstream side of the valve body, and the communication 37 is oriented toward a center of the flow path 3 in the upstream side of the valve body. The communication hole 35, 36, 37 and the bypass chamber 27 form a communication path communicating the circular space 16 to the flow path 3 in the upstream side of the valve body.

Plugs 38, 39 are attached to the outside ports of the communication hole 36 excluding the portion communicating to the communication hole 37 and the outside ports are closed. Designated at reference numerals 41, 42, 43, 44 is an O-ring, at 45 a cap, at 46 a operation handle, at 47 a nut, at 48 an indicator, at 49 a bolt insertion hole for connecting the valve body holder 2 to the short pipe 7, at 50 a bolt insertion hole for connecting the exit ring 25 to the short pipe 7, and at 51 a bolt insertion hole for connection to a pipe line (not shown) provided in a bracket 52 in the short pipe 7.

The check valve 1 based on the swing system and short pipe 7 having the configuration as described above are installed for use in a pipe line in which a pump not shown in the figure is provided in the side of check valve 1 based on the swing system. In normal use, when a fluid pumped up with the pump is flowing in the regular direction in the fully closed state shown in FIG. 1, the valve body 5 is driven by the fluid pressure and rotates around the valve shaft 6 against the energizing force of the spring 10 to open the flow path 3 by a prescribed angle, and thus the fluid can flow from the upstream side to the downstream side. In this step, a portion of the fluid in the upstream side also flows into the circular space 16 via the communication holes 36, 37, bypass valve chamber 27, and communication hole 35 to fill the space with the fluid.

When a flow of the fluid stops or a reverse flow of the fluid occurs for some reason or other, the valve body 5 rotates in the reverse direction according to a force of the spring 10, and the valve body 5 contacts the valve sheet 11 in the fully closed state, so that the flow path 3 is blocked. When the valve is closed, a portion of the fluid flowing in the reverse direction goes from the opening 17 of the retainer pipe 15 into the circular space 16 expanding the elastic tube 18 toward the circular space 16 as shown in the figure, so that the fluid in the circular space 16 flows via the communication hole 35, bypass valve chamber 27, communication holes 36, 37 into the flow path 3 in the upstream side of the valve. Because of this configuration, a water-hammer phenomenon caused by a rapid reverse flow is effectively evaded, thus water-hammer being prevented.

In other words, transitional rise of a water pressure due to a reverse flow is prevented by expansion of the elastic tube 18 into the circular space 16, and as a result rise of a water pressure inside the elastic tube 18 (a water pressure in the downstream side) becomes more modest, thus generation of water-hammer being prevented. When the elastic tube 18 expands, the pump in the upstream side does not work with a pressure in the upstream side dropped to a level close to the atmospheric pressure, and further the fluid resides in the flow path with the pressure therein becoming higher than that in the upstream side because the valve body 5 is closed in the downstream side, so that the fluid in the circular space 16 flows from the communication hole 35, bypass valve chamber 27, communication holes 36, 37 into the flow path 3 in the upstream side of the valve, does not prevent expansion of the elastic tube 18, and therefore the elastic tube 18 can expand smoothly.

The elastic tube 18 and the retainer pipe 15 having the opening 17 are provided in the downstream side, so that, for instance, pulsation of the pump can effectively be prevented. Namely, even when pulsation occurs, for instance, in the pump provided in the upstream side, the pulsation propagates through the opening 17 of the retainer pipe 15 to a flow of the fluid and is attenuated. Further the pulsation having reached inside of the elastic tube 18 is propagated to the circular space 16 outside the elastic tube 18 and is attenuated therein. As described above, by providing the retainer pipe 15 having the opening 17 thereof, elastic tube 18, communication hole 35, bypass valve chamber 27, and communication holes 36, 37, there is also provided the function as a silencer for preventing pulsation of a fluid passing therethrough.

As described above, when the valve closed, rise of a pressure due to a rapid reverse flow loaded to the valve body 5 can be absorbed because of expansion of the elastic tube 18. In addition, the fluid inside the circular space 16 can be led to the flow path 3 in the upstream side via the communication hole 35, bypass valve chamber 27, and communication holes 36, 37 because of expansion of the elastic tube 18, and this escaping mechanism can be realized with the communication holes 35, 36, 37 and the bypass valve chamber 27 formed between the valve body holder 2 and short pipe 7 by making use of a portion of the mechanism of the bypass valve 26 for draining water. Different from the conventional technology, it is not required to provide a small valve hole in a valve body or provide a small valve body for opening and closing the small valve hole, nor to provide a separate bypass pipe line, which ensures a simple structure with low facility cost.

The embodiment was only described above for a prefered example, and this invention is not limited to this embodiment, and other embodiments may be employed when carrying out the present invention. Namely, the check valve for instance is not always required to be one based on the swing system, and the present invention may be applied to various types of check valves. Further, the check valve is installed with a sidelong posture in the embodiment as shown in the figure, but the angle may be changed by 90 degrees to install the check valve with a vertical posture. In addition, minute matters relating to its design can be changed with other ones without spoiling the effect.

What is claimed is:

1. A water-hammer preventing unit for a check valve comprising:
    a valve body holder having a flow path;
    a hollow and short pipe having openings at two edges thereof with the opening at one edge thereof communicating to the flow path in the said valve holder;
    a valve body provided in the said valve body holder so that the flow path can be opened or closed;
    an energizing member for energizing the said valve body in the valve-closing direction;
    a retainer pipe having openings at two edges thereof provided in the said short pipe to form a circular space with the short pipe with an opening formed on the peripheral wall thereof; and
    an elastic tube provided on an external peripheral surface of the said retainer pipe and covering the opening,
    wherein a communication path is formed between the short pipe and the valve body holder, and the communication path communicates the circular space to the flow path in the upstream side of the valve body and, when a fluid flows in the reverse direction, a portion of the fluid is accommodated from the opening into the circular space by expanding the elastic tube toward the circular space, and also flows a portion of the fluid in the said circular space to the flow path in the upstream side from the valve body.

2. The water-hammer preventing unit for a check valve according to claim 1,
    wherein a plurality of the said openings are provided excluding two edge sections thereof with a prescribed space to the circumferential direction, and are formed as slits along the axial direction of the pipe.

3. The water-hammer preventing unit for a check valve according to claim 1,
    wherein two edge sections of the said elastic tubes are held by external surfaces of the retainer pipe in the two edge sections and external surfaces of the short pipe in the two edge sections and are bent inward, and one edge section thereof is pressed and fixed by a retainer ring with the other edge section pressed and fixed by an exit ring.

4. The water-hammer preventing unit for a check valve according to claim 1,
    wherein the said communication path comprises a bypass valve chamber formed in the short pipe in the valve body side, a communication hole communicating the valve chamber to the circular space, and a communication hole communicating the valve chamber to a flow path in the upstream side of the valve body.

5. The water-hammer preventing unit for a check valve according to claim 4,
    wherein the communication hole communicating the said bypass valve chamber to the circular space is formed substantially in parallel to the axial line of the short pipe, and the communication hole communicating the bypass valve chamber to the flow path in the upstream side of the valve body is formed inclining to a center of the flow path in the upstream side of the valve body.

* * * * *